(12) United States Patent
Woodacre et al.

(10) Patent No.: US 10,404,800 B2
(45) Date of Patent: Sep. 3, 2019

(54) CACHING NETWORK FABRIC FOR HIGH PERFORMANCE COMPUTING

(71) Applicant: Hewlett Packard Enterprise Development LP, Houston, TX (US)

(72) Inventors: Michael Woodacre, Winchester (GB); Randal S. Passint, Chippewa Falls, WI (US)

(73) Assignee: Hewlett Packard Enterprise Development LP, Houston, TX (US)

(*) Notice: Subject to any disclaimer, the term of this patent is extended or adjusted under 35 U.S.C. 154(b) by 21 days.

(21) Appl. No.: 15/650,296

(22) Filed: Jul. 14, 2017

(65) Prior Publication Data
US 2018/0020054 A1    Jan. 18, 2018

Related U.S. Application Data

(60) Provisional application No. 62/362,911, filed on Jul. 15, 2016.

(51) Int. Cl.
| | | |
|---|---|---|
| *G06F 12/00* | (2006.01) | |
| *H04L 29/08* | (2006.01) | |
| *G06F 12/0817* | (2016.01) | |
| *G06F 12/0831* | (2016.01) | |
| *H04L 12/947* | (2013.01) | |
| *H04L 12/931* | (2013.01) | |

(52) U.S. Cl.
CPC ...... *H04L 67/1097* (2013.01); *G06F 12/0817* (2013.01); *G06F 12/0831* (2013.01); *H04L 67/2842* (2013.01); *G06F 2212/224* (2013.01); *G06F 2212/621* (2013.01); *H04L 49/25* (2013.01); *H04L 49/358* (2013.01)

(58) Field of Classification Search
CPC ............ G06F 12/0817; G06F 12/0831; G06F 2212/224; G06F 2212/621
See application file for complete search history.

(56) References Cited

U.S. PATENT DOCUMENTS

| | | | |
|---|---|---|---|
| 6,148,349 A | 11/2000 | Chow et al. | |
| 7,234,003 B2* | 6/2007 | Zaumen | H04L 49/90 709/231 |
| 7,647,590 B2 | 1/2010 | Archer et al. | |
| 8,229,945 B2 | 7/2012 | Dinker et al. | |

(Continued)

FOREIGN PATENT DOCUMENTS

WO    WO 2017/171798 A1    10/2017

*Primary Examiner* — Yong J Choe
(74) *Attorney, Agent, or Firm* — Hewlett Packard Enterprise Patent Department

(57) ABSTRACT

An apparatus and method exchange data between two nodes of a high performance computing (HPC) system using a data communication link. The apparatus has one or more processing cores, RDMA engines, cache coherence engines, and multiplexers. The multiplexers may be programmed by a user application, for example through an API, to selectively couple either the RDMA engines, cache coherence engines, or a mix of these to the data communication link. Bulk data transfer to the nodes of the HPC system may be performed using paged RDMA during initialization. Then, during computation proper, random access to remote data may be performed using a coherence protocol (e.g. MESI) that operates on much smaller cache lines.

12 Claims, 8 Drawing Sheets

(56) References Cited

U.S. PATENT DOCUMENTS

| | | | |
|---|---|---|---|
| 8,396,937 B1 * | 3/2013 | O'Krafka | G06F 13/28 709/213 |
| 8,407,424 B2 | 3/2013 | Dai et al. | |
| 9,734,063 B2 | 8/2017 | Novakovic et al. | |
| 2007/0067435 A1 | 3/2007 | Landis et al. | |
| 2016/0026590 A1 | 1/2016 | Park et al. | |

* cited by examiner

CACHING NETWORK FABRIC FOR HIGH PERFORMANCE COMPUTING

CROSS-REFERENCE TO RELATED APPLICATION

This application claim the benefit of U.S. Provisional Application No. 62/362,911, filed Jul. 15, 2016, the contents of which are incorporated herein by reference in their entirety.

BACKGROUND OF THE DISCLOSURE

High performance computing ("HPC") or "supercomputer" systems are used to perform computations that require large quantities of computing resources. HPC systems may be used, for example, in weather forecasting and aerodynamic modeling, cryptography and code breaking, simulation of nuclear weapons testing or molecular dynamics, and 'big data' analytics. These applications may require large amounts of memory or data storage, and large numbers of (or extremely fast) memory accesses or computational operations. Often, these large amounts of memory or data storage are provided by network many computers together. Some clustered HPC systems provide federated memory using non-uniform memory access ("NUMA"), which allows each node to access the memory of some or all of the other nodes.

There are two main paradigms used to design HPC systems: scale-out and scale-up, which roughly correspond to the ideas of 'bigger' and 'better'. Scale-out systems are 'bigger', in the sense that they network many commodity computing devices (such as retail server computers) in a cluster. By contrast, scale-up systems are 'better', in the sense that they embody better, often cutting-edge technology: faster processors, faster memory, larger memory capability, and so on.

As HPC systems scaled out, the computing resources required for the operating system kernel to intercede on behalf of the user application became a performance bottleneck. To combat this problem, remote direct memory access ("RDMA") and a direct data placement ("DDP") protocol were developed, allowing a user application to configure networking hardware to send and receive data directly from application memory over the network interconnect to remote nodes, without kernel processing. Despite the development of many technologies to improve the HPC network interconnect, HPC system design still largely involves choosing between scale-out and scale-up based on the particular type of application. Paged applications are often cheaper using scale-out designs that don't require RDMA, while other applications work better with scale-up designs that use RDMA and cache lines.

SUMMARY OF VARIOUS IMPLEMENTATIONS

In accordance with various implementations of the present disclosure, an improved network fabric enables user applications running on Intel sockets, many core processors, and/or accelerators (FPGA) to coherently share data in memory and enable efficient heterogeneous computing. The result optimizes application performance, overall system productivity, hardware utilization, and energy efficiency, by selecting the mode of data transport (scale-out or scale-up) that is optimal for a particular part of a workflow.

Thus, one implementation of the disclosure is an apparatus for exchanging data using a data communication link between a first computing node and a second computing node. The computing nodes cooperatively execute a user application using the exchanged data. The apparatus includes one or more processing cores. The apparatus also includes one or more remote direct memory access (RDMA) engines. Each RDMA engine is separately capable of providing access by the first computing node to pages of a memory of the second computing node. The apparatus further includes one or more cache coherence engines. Each cache coherence engine is separately capable of providing access by the first computing node to cache lines of the memory of the second computing node. Finally, the apparatus includes one or more multiplexers. The multiplexers are to selectively couple, to the data communication link according to an instruction of the user application, at least one RDMA engine or at least one cache coherence engines.

In some implementations, the apparatus also includes one or more special-purpose co-processing cores that are coupled to the processing cores, the RDMA engines, and the cache coherence engines by a common data bus. The data communication link may have a high bandwidth and a low latency, and may include a networking cable or a data bus on a backplane.

Each of the cache coherence engines may separately provide several logical features as well. One such feature is a socket interface for implementing a wire protocol, which may be the Universal Path Interconnect (UPI) or the Quick-Path Interconnect (OPI). Another feature is a packet interface for receiving requests from, and generating requests to, the socket interface. Yet another feature is a remote proxy for tracking requests by the first computing node to access the cache lines of the memory of the second computing node. Still another feature is a local proxy for tracking requests by the second computing node to access cache lines of a memory of the first computing node. An additional feature is a request accelerating cache for accelerating requests by the second computing node. Another additional feature is an invalidation engine for carrying out a portion of a cache coherence protocol, which may be, for example, the Modified-Exclusive-Shared-Invalid (MESI) protocol. Still another feature is an interconnect interface in communication with the remote proxy, and the local proxy, and the invalidation engine, for using the data communication link to exchange packets of the data between the first computing node and the second computing node.

Another implementation of the disclosure is a method of exchanging data using the above-described apparatus. The method may have several phases, each corresponding to a phase of a large computation, such as an initialization phase and a compute phase. The method includes first executing, in the first computing node, a first instruction of the user application to access pages of a memory of the second computing node. Next, the method includes selectively coupling, by one or more multiplexers, one or more remote direct memory access (RDMA) engines to the data communication link. Then, the method includes receiving the pages of memory, by the first computing node from the second computing node. In another phase, the method includes executing, in the first computing node, a second instruction of the user application to access cache lines of the memory of the second computing node. Then, the method calls for selectively coupling, by the one or more multiplexers, one or more cache coherence engines to the data communication link. Finally, the method requires receiving the cache lines of memory, by the first computing node from the second computing node. to Executing the first instruction may include executing it using a special-purpose co-processing core. An extension of the method includes separately configuring each of the one or more cache coherence engines to provide the logical features described above: socket interface, packet interface, remote proxy, local proxy, request accelerating cache, invalidation engine, and interconnect interface.

Yet another implementation of the disclosure is a tangible computer-readable medium in which is non-transitorily fixed a series of computer instructions that, when executed by the first computing node, produce the above-described method and its variations.

BRIEF DESCRIPTION OF THE DRAWINGS

Those skilled in the art should more fully appreciate advantages of various implementations of the disclosure from the following "Description of Illustrative Implementations," discussed with reference to the drawings summarized immediately below.

DESCRIPTION OF ILLUSTRATIVE IMPLEMENTATIONS

Figure 1:
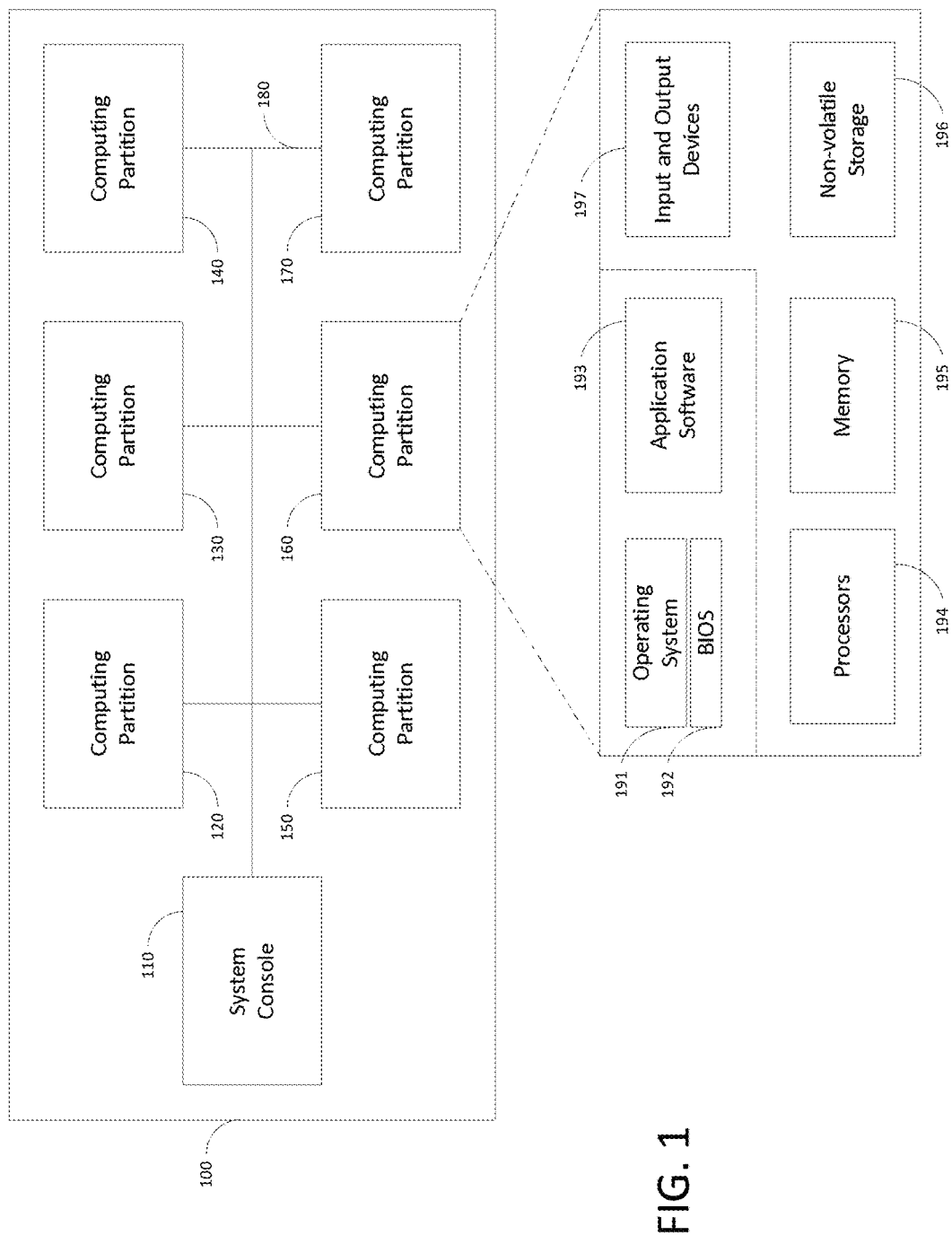
FIG. 1 schematically shows a logical view of an HPC system in accordance with one implementation of the present disclosure.

In various implementations of the disclosure, scale-up cache coherence functions and scale-out RDMA functions are provided in a single integrated circuit package for use in a host fabric interface. The single package permits application program actions, software paging, and kernel intervention operations to be eliminated in all cases. However, unlike prior scale-out fabrics that page data between processors, a processor also can use an implementation of the disclosure to directly and transparently move 64 byte processor cache lines across the fabric to any processor on any node, regardless of node type. A configurable integrated circuit multiplexer permits switching between these modes of operation.

This integrated solution enables sockets and accelerators (such as coprocessors) to access and process data regardless of where it resides. Applications that have been optimized for data decomposition and inter-process communication can run on this new fabric at maximum performance (for example, traditional HPC software optimized around the industry-standard Message Passing Interface, or "MPI"). Also, the fabric supports flexible application development environments that are either unable to, or not initially focused on, data decomposition across nodes. This includes many types of software prototyping where developers don't always want to be limited by the physical limits of memory per node, or CPU cores per node. Applications in this space will benefit from the transparent use to larger amounts of coherent memory, as well as easy access to a greater numbers of cores than traditionally considered.

The new fabric capability also reduces system management complexity. Resources are managed at a more granular level when considered appropriate (rather than managing ever-increasing numbers of thin compute nodes). Managing multiple nodes together by leveraging coherence does not need to impact performance on an application using message passing between processors in a node or across nodes.

Ultimately, the various implementations permit improved application performance in a more robust and efficient environment that is easier to manage. They deliver high bandwidth communication through industry standard RDMA, as well as high bandwidth, low latency, fine-grained coherent memory accesses between processors and accelerators.

Moreover, implementations provide for greater flexibility of heterogeneous compute systems with node configurations comprised of Intel Xeon sockets, many core processors, and FPGAs. The resultant configurations can communicate either through message passing (i.e., scale-out) or through shared memory (i.e., scale-up) in a coherent manner to provide increased levels of performance and compute efficiency for the full spectrum of applications used in HPC, including analysis and visualization. The result will be large scale systems that offer the opportunity for applications to optimize their data usage. System management complexity can also be reduced by aggregation of nodes. These benefits collectively lower the costs of larger deployments and eliminate the need for over-provisioning nodes with memory and interconnect fabrics.

Details of these and other implementations are discussed below.

System Architecture

FIG. 1 schematically shows a logical view of an exemplary high-performance computing system 100 that may be used with illustrative implementations of the present disclosure. Specifically, as known by those in the art, a "high-performance computing system," or "HPC system," is a computing system having a plurality of modular computing resources that are tightly coupled using hardware interconnects, so that processors may access remote data directly using a common memory address space.

The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computing partitions that are administratively assigned as described in more detail below, and often has only one partition that encompasses all of the available computing resources. Accordingly, this figure should not be seen as limiting the scope of the disclosure.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computing partition has various hardware allocated to it by a system operator, including one or more processors 194, volatile memory 195, non-volatile storage 196, and input and output ("I/O") devices 197 (e.g., network ports, video display devices, keyboards, and the like). However, in HPC systems like the implementation in FIG. 1, each computing partition has a great deal more processing power and memory than a typical desktop computer. The OS software may include, for example, a Windows® operating system by Microsoft Corporation of Redmond, Wash., or a Linux operating system. Moreover, although the BIOS may be provided as firmware by a hardware manufacturer, such as Intel Corporation of Santa Clara, Calif., it is typically customized according to the needs of the HPC system designer to support high-performance computing, as described below in more detail.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100.

These particular functions are described in more detail in the section below entitled "System Operation."

Figure 2:
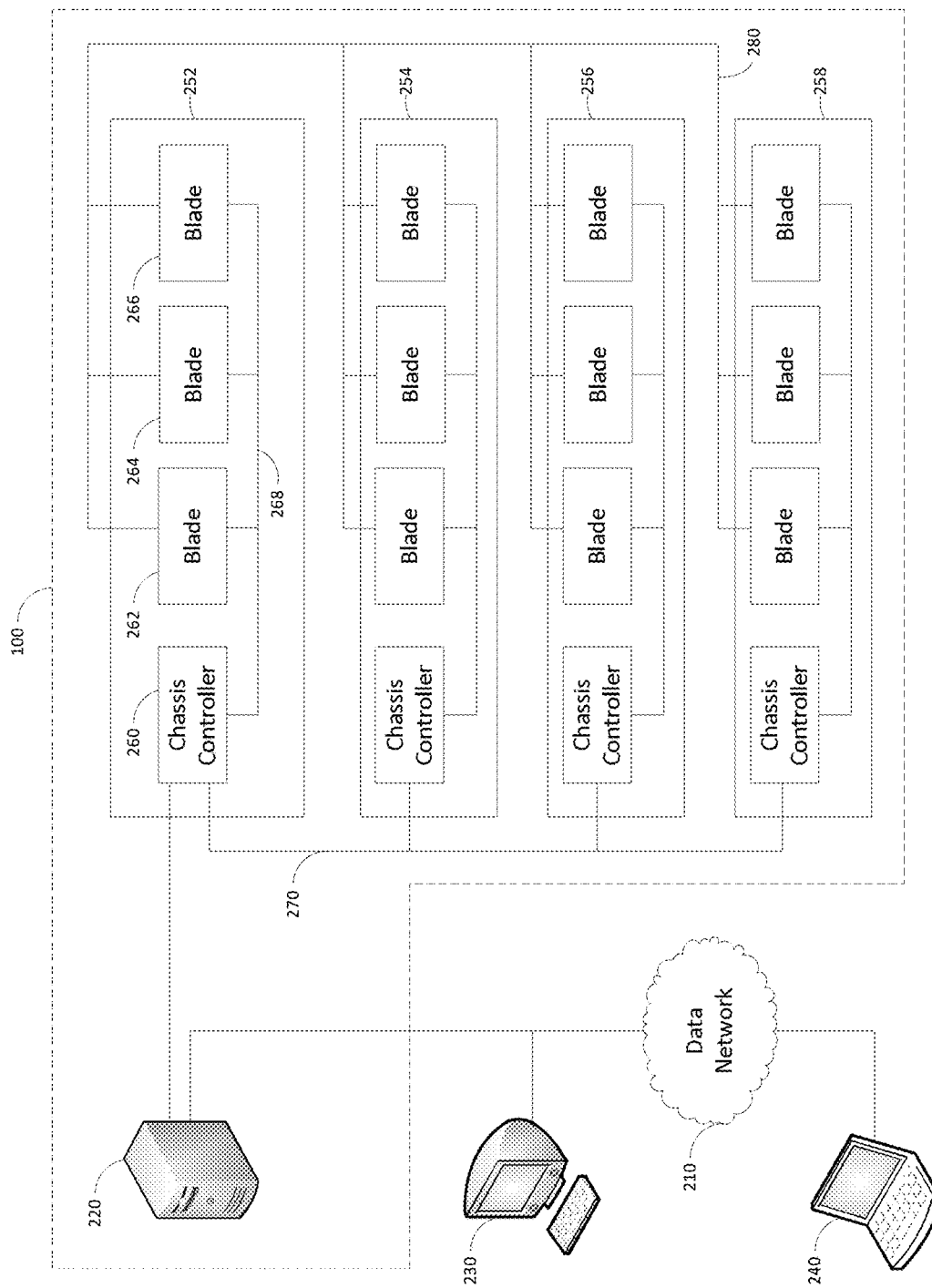
FIG. 2 schematically shows a physical view of the HPC system of FIG. 1.

FIG. 2 schematically shows a physical view of a high performance computing system 100 in accordance with the implementation of FIG. 1. The hardware that comprises the HPC system 100 of FIG. 1 is surrounded by the dashed line. The HPC system 100 is connected to a customer data network 210 to facilitate customer access.

The HPC system 100 includes a system management node ("SMN") 220 that performs the functions of the system console 110. The management node 220 may be implemented as a desktop computer, a server computer, or other similar computing device, provided either by the customer or the HPC system designer, and includes software necessary to control the HPC system 100 (i.e., the system console software).

The HPC system 100 is accessible using the data network 210, which may include any data network known in the art, such as a customer local area network ("LAN"), a virtual private network ("VPN"), the Internet, or the like, or a combination of these networks. Any of these networks may permit a number of users to access the HPC system resources remotely and/or simultaneously. For example, the management node 220 may be accessed by a customer computer 230 by way of remote login using tools known in the art such as Windows® Remote Desktop Services or the UNIX secure shell. If the customer is so inclined, access to the HPC system 100 may be provided to a remote computer 240. The remote computer 240 may access the HPC system by way of a login to the management node 220 as just described, or using a gateway or proxy system as is known to persons in the art.

The hardware computing resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computing partitions. A blade chassis is an electronic chassis that is configured to house, power, and provide high-speed data communications between a plurality of stackable, modular electronic circuit boards called "blades." Each blade includes enough computing hardware to act as a standalone computing server. The modular design of a blade chassis permits the blades to be connected to power and data lines with a minimum of cabling and vertical space.

Accordingly, each blade chassis, for example blade chassis 252, has a chassis management controller 260 (also referred to as a "chassis controller" or "CMC") for managing system functions in the blade chassis 252, and a number of blades 262, 264, 266 for providing computing resources. Each blade, for example blade 262, contributes its hardware computing resources to the collective total resources of the HPC system 100. The system management node 220 manages the hardware computing resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268, described below in more detail. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280. To that end, the computing connection 280 illustratively has a high-bandwidth, low-latency system interconnect, such as NumaLink, developed by Silicon Graphics International Corp. of Milpitas, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. Similarly, the chassis controller 260 may receive hardware error data from one or more of the blades 262-266 and store this information for later analysis in combination with error data stored by the other chassis controllers. In some implementations, such as that shown in FIG. 2, the SMN 220 or a customer computer 230 are provided access to a single, master chassis controller 260 that processes system management commands to control the HPC system 100 and forwards these commands to the other chassis controllers. In other implementations, however, an SMN 220 is coupled directly to the management connection 270 and issues commands to each chassis controller individually. Persons having ordinary skill in the art may contemplate variations of these designs that permit the same type of functionality, but for clarity only these designs are presented.

The blade chassis 252, its blades 262-266, and the local management bus 268 may be provided as known in the art. However, the chassis controller 260 may be implemented using hardware, firmware, or software provided by the HPC system designer. Each blade provides the HPC system 100 with some quantity of processors, volatile memory, non-volatile storage, and I/O devices that are known in the art of standalone computer servers. However, each blade also has hardware, firmware, and/or software to allow these computing resources to be grouped together and treated collectively as computing partitions, as described below in more detail in the section entitled "System Operation."

While FIG. 2 shows an HPC system 100 having four chassis and three blades in each chassis, it should be appreciated that these figures do not limit the scope of the disclosure. An HPC system may have dozens of chassis and hundreds of blades; indeed, HPC systems often are desired because they provide very large quantities of tightly-coupled computing resources.

Figure 3:
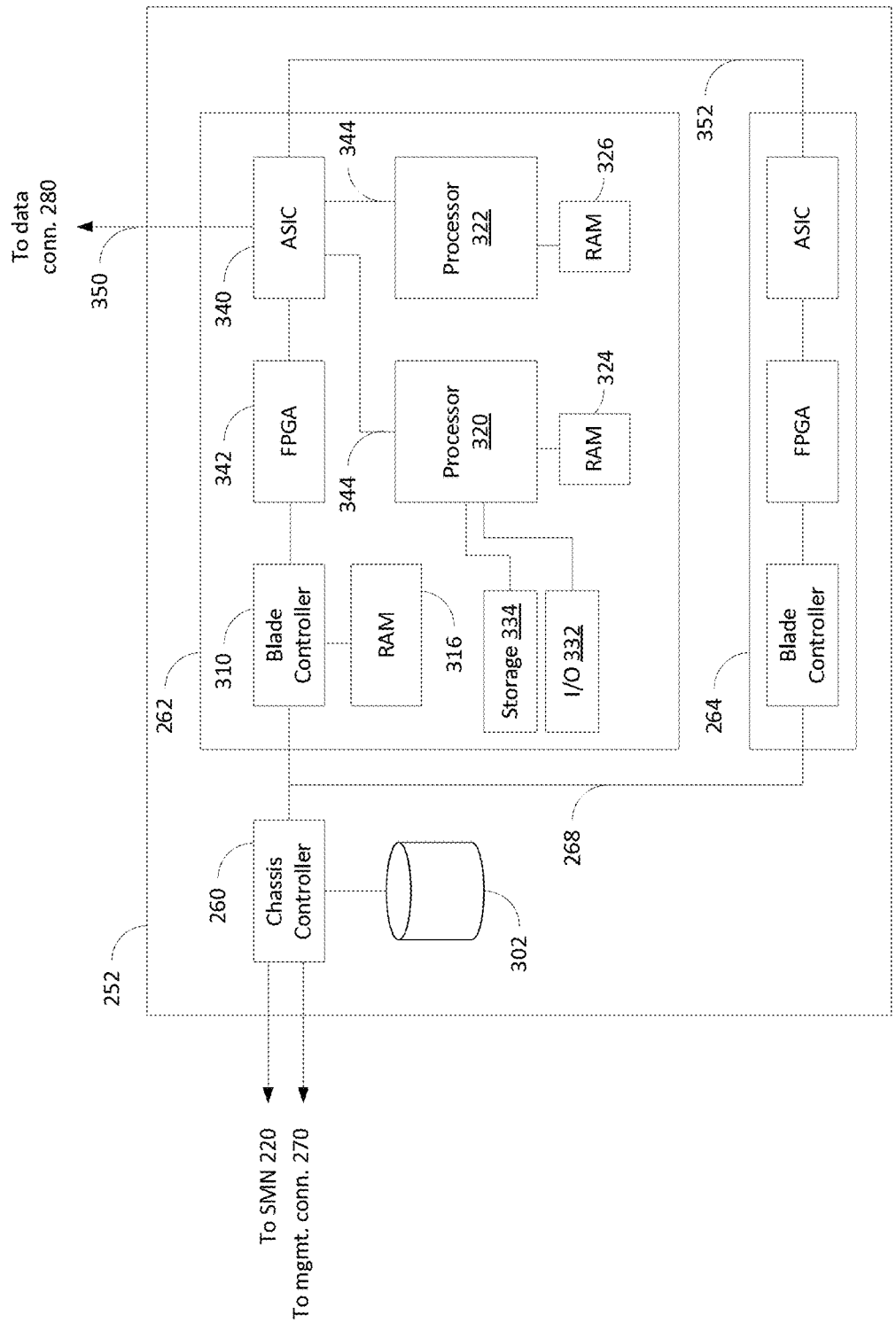
FIG. 3 schematically shows details of a blade chassis of the HPC system of FIG. 1.

FIG. 3 schematically shows a single blade chassis 252 in more detail. In this figure, parts not relevant to the immediate description have been omitted.

The chassis controller 260 is shown with its connections to the system management node 220 and to the management connection 270. The chassis controller 260 may be provided with a chassis data store 302 for storing chassis management data. In some implementations, the chassis data store 302 is volatile random access memory ("RAM"), in which case data in the chassis data store 302 are accessible by the SMN 220 so long as power is applied to the blade chassis 252, even if one or more of the computing partitions has failed (e.g., due to an OS crash) or a blade has malfunctioned. In other implementations, the chassis data store 302 is non-volatile storage such as a hard disk drive ("HDD") or a solid state drive ("SSD"). In these implementations, data in the chassis data store 302 are accessible after the HPC system has been powered down and rebooted.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. For more detail on the operations of the chassis controller and blade controller, see the section entitled "HPC System Operation" below. The blade controller 310 may be implemented as custom hardware, designed by the HPC system designer to permit communication with the chassis controller 260. In addition, the blade controller 310 may have its own RAM 316 to carry out its management functions. The chassis controller 260 communicates with the blade controller of each blade using the local management bus 268, as shown in FIG. 3 and the previous figures.

The blade 262 also includes one or more microprocessors 320, 322 (alternatively referred to as "processors 320 or 322" or generically referred to as "processors 320") that are connected to RAM 324, 326. Blade 262 may be alternately configured so that multiple processors may access a common set of RAM on a single bus, as is known in the art. It should also be appreciated that processors 320, 322 may include any number of central processing units ("CPUs") or cores, as is known in the art. The processors 320, 322 in the blade 262 are connected to other items, such as a data bus that communicates with I/O devices 332, a data bus that communicates with non-volatile storage 334, and other buses commonly found in standalone computing systems. (For clarity, FIG. 3 shows only the connections from processor 320 to these other devices.) The processors 320, 322 may be, for example, Intel® Core™ processors manufactured by Intel Corporation. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in accordance with illustrative implementations of the present disclosure.

Each blade (e.g., the blades 262 and 264) includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, (optionally) coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the computing resources of the blade 262.

In this connection, the hub ASIC 340 connects with the blade controller 310 either through a direct connection, or by way of a field-programmable gate array ("FPGA") 342 or similar programmable device for passing signals between integrated circuits. Those skilled in the art can select the appropriate connection between the hub ASIC 340 and the blade controller 310. Discussion of the direct connection or indirect connection should not limit various implementations of the disclosure.

In particular, signals are generated on output pins of the blade controller 310, in response to commands issued by the chassis controller 260. In the indirect connection case, these signals are translated by the FPGA 342 into commands for certain input pins of the hub ASIC 340, and vice versa. For example, a "power on" signal received by the blade controller 310 from the chassis controller 260 requires, among other things, providing a "power on" voltage to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between computing resources and system management, the hub ASIC 340 is connected to the processors 320, 322 by way of a high-speed processor interconnect 344. In one implementation, the processors 320, 322 are manufactured by Intel Corporation which provides the Intel® QuickPath Interconnect ("QPI") for this purpose, and the hub ASIC 340 includes a module for communicating with the processors 320, 322 using QPI. Other implementations may use other processor interconnect configurations.

The hub chip 340 in each blade also provides connections to other blades for high-bandwidth, low-latency data communications. Thus, the hub chip 340 includes a link 350 to the computing connection 280 that connects different blade chassis. This link 350 may be implemented using networking cables, for example. The hub ASIC 340 also includes connections to other blades in the same blade chassis 252.

The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computing tasks. Data communication on both the inter-chassis computing connection 280 and the intra-chassis computing connection 352 may be implemented using the NumaLink protocol or a similar protocol.

HPC System Operation

System management commands generally propagate from the SMN 220, through the management connection 270 to the blade chassis (and their chassis controllers), then to the blades (and their blade controllers), and finally to the hub ASICS that implement the commands using the system computing hardware.

As a concrete example, consider the process of powering on an HPC system. In accordance with exemplary implementations, the HPC system 100 is powered when a system operator issues a "power on" command from the SMN 220. The SMN 220 propagates this command to each of the blade chassis 252-258 by way of their respective chassis controllers, such as chassis controller 260 in blade chassis 252. Each chassis controller, in turn, issues a "power on" command to each of the respective blades in its blade chassis by way of their respective blade controllers, such as blade controller 310 of blade 262. Blade controller 310 issues a "power on" command to its corresponding hub chip 340 using the FPGA 342, which provides a signal on one of the pins of the hub chip 340 that allows it to initialize. Other commands propagate similarly.

Once the HPC system is powered on, its computing resources may be divided into computing partitions. The quantity of computing resources that are allocated to each computing partition is an administrative decision. For example, a customer may have a number of projects to complete, and each project is projected to require a certain amount of computing resources. Different projects may require different proportions of processing power, memory, and I/O device usage, and different blades may have different quantities of the resources installed. The HPC system administrator takes these considerations into account when partitioning the computing resources of the HPC system 100. Partitioning the computing resources may be accomplished by programming each blade's RAM 316. For example, the SMN 220 may issue appropriate blade programming commands after reading a system configuration file.

The collective hardware computing resources of the HPC system 100 may be divided into computing partitions according to any administrative need. Thus, for example, a single computing partition may include the computing resources of some or all of the blades of one blade chassis 252, all of the blades of multiple blade chassis 252 and 254, some of the blades of one blade chassis 252 and all of the blades of blade chassis 254, all of the computing resources of the entire HPC system 100, and other similar combinations. Hardware computing resources may be partitioned statically, in which case a reboot of the entire HPC system 100 is required to reallocate hardware. Alternatively and preferentially, hardware computing resources are partitioned dynamically while the HPC system 100 is powered on. In this way, unallocated resources may be assigned to a partition without interrupting the operation of other partitions.

It should be noted that once the HPC system 100 has been appropriately partitioned, each partition may be considered to act as a standalone computing system. Thus, two or more partitions may be combined to form a logical computing group inside the HPC system 100. Such grouping may be necessary if, for example, a particular computational task is allocated more processors or memory than a single operating system can control. For example, if a single operating system can control only 64 processors, but a particular computational task requires the combined power of 256 processors, then four partitions may be allocated to the task in such a group. This grouping may be accomplished using techniques known in the art, such as installing the same software on each computing partition and providing the partitions with a VPN.

Once at least one partition has been created, the partition may be booted and its computing resources initialized. Each computing partition, such as partition 160, may be viewed logically as having a single OS 191 and a single BIOS 192. As is known in the art, BIOS is a collection of instructions that electrically probes and initializes the available hardware to a known state so that the OS can boot, and is typically provided in a firmware chip on each physical server. However, a single logical computing partition 160 may span several blades, or even several blade chassis. A blade may be referred to as a "computing node" or simply a "node" to emphasize its allocation to a particular partition.

Booting a partition in accordance with an implementation of the disclosure requires a number of modifications to be made to a blade chassis that is purchased from stock. In particular, the BIOS in each blade are modified to determine other hardware resources in the same computing partition, not just those in the same blade or blade chassis. After a boot command has been issued by the SMN 220, the hub ASIC 340 eventually provides an appropriate signal to the processor 320 to begin the boot process using BIOS instructions. The BIOS instructions, in turn, obtain partition information from the hub ASIC 340 such as: an identification (node) number in the partition, a node interconnection topology, a list of devices that are present in other nodes in the partition, a master clock signal used by all nodes in the partition, and so on. Armed with this information, the processor 320 may take whatever steps are required to initialize the blade 262, including 1) non-HPC-specific steps such as initializing I/O devices 332 and non-volatile storage 334, and 2) also HPC-specific steps such as synchronizing a local hardware clock to a master clock signal, initializing HPC-specialized hardware in a given node, managing a memory directory that includes information about which other nodes in the partition have accessed its RAM, and preparing a partition-wide physical memory map.

At this point, each physical BIOS has its own view of the partition, and all of the computing resources in each node are prepared for the OS to load. The BIOS then reads the OS image and executes it, in accordance with techniques known in the art of multiprocessor systems. The BIOS presents to the OS a view of the partition hardware as if it were all present in a single, very large computing device, even if the hardware itself is scattered among multiple blade chassis and blades. In this way, a single OS instance spreads itself across some, or preferably all, of the blade chassis and blades that are assigned to its partition. Different operating systems may be installed on the various partitions. If an OS image is not present, for example immediately after a partition is created, the OS image may be installed using processes known in the art before the partition boots.

Once the OS is safely executing, its partition may be operated as a single logical computing device. Software for carrying out desired computations may be installed to the various partitions by the HPC system operator. Users may then log into the SMN 220. Access to their respective partitions from the SMN 220 may be controlled using volume mounting and directory permissions based on login credentials, for example. The system operator may monitor the health of each partition, and take remedial steps when a hardware or software error is detected. The current state of long-running application programs may be saved to non-volatile storage, either periodically or on the command of the system operator or application user, to guard against losing work in the event of a system or application crash. The system operator or a system user may issue a command to shut down application software. Other operations of an HPC partition may be known to a person having ordinary skill in the art. When administratively required, the system operator may shut down a computing partition entirely, reallocate or deallocate computing resources in a partition, or power down the entire HPC system 100.

Caching Network Fabric

Various implementations of the disclosure provide a host fabric interface ("HFI") device that provides both scale-out and scale-up functions, as required by a user application. This is accomplished at the hardware level by combining RDMA capabilities with cache coherence capabilities in a single integrated circuit package. The combined package includes an RDMA engine for providing page access between nodes, and a cache coherence engine for providing cache line access between nodes. The combined package maintains full bandwidth of the interface channel, while maintaining low latency for remote accesses between processors. In some implementations, FPGA technology provides enhanced accelerator functions.

Figure 4:
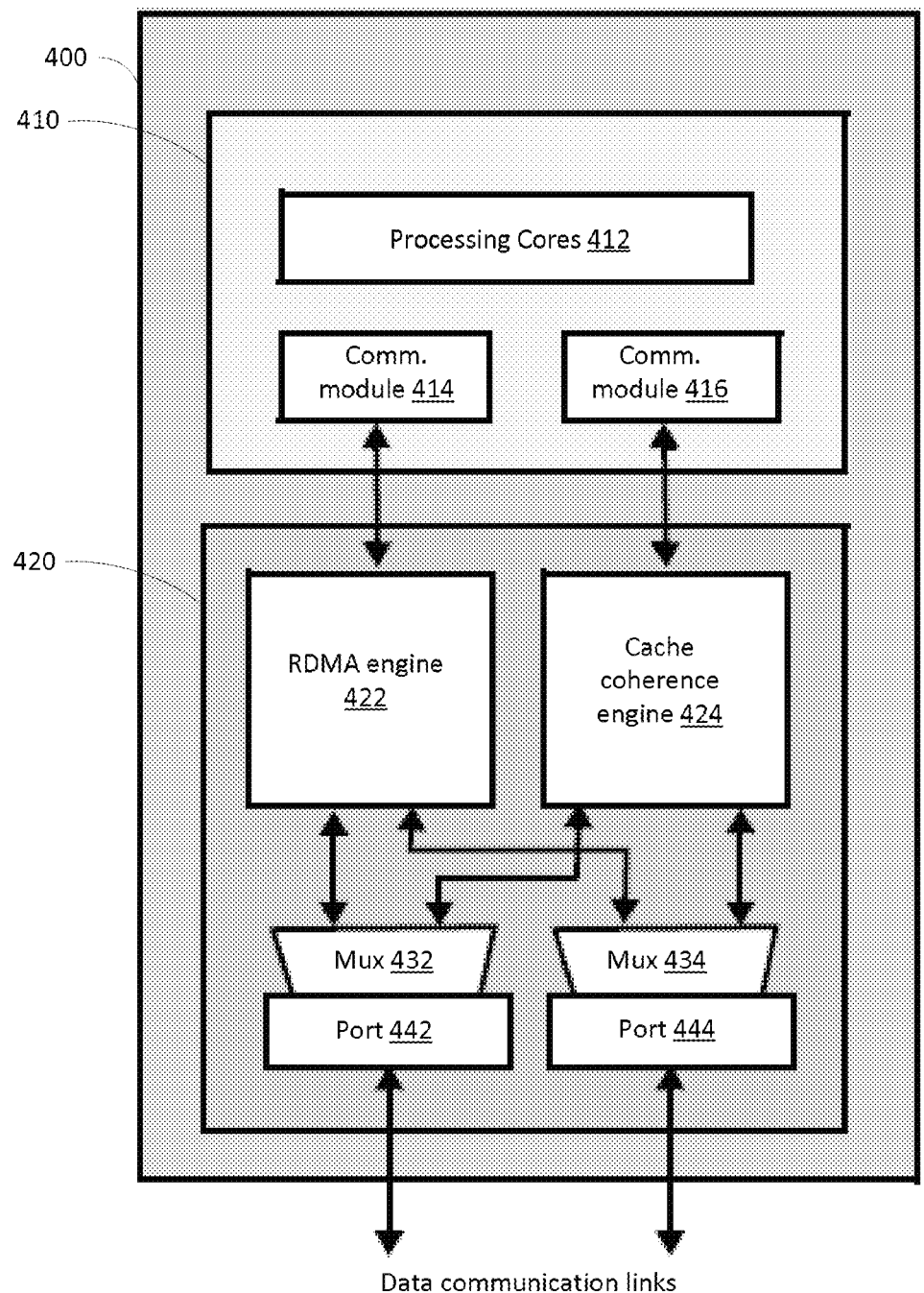
FIG. 4 schematically shows a first implementation of the disclosure having a coprocessor, RDMA engine, cache coherence engine, and two output ports.

FIG. 4 schematically shows a first implementation of the disclosure as a host fabric interface (HFI) 400. The HFI 400 includes two functional blocks: a processing block 410 provides computational power, while a network interface block 420 provides fabric services for coupling the processing block to other nodes in the HPC system. The HFI 400 may be provided, for example, as an expansion card that is inserted into a blade motherboard, or it may be integral with the motherboard as an integrated circuit package manufactured on a single silicon substrate, or as a number of such packages.

The processing block 410 provides one or more processing cores 412. It should be appreciated that the processing cores 412 may be general purpose computer processors or specialized coprocessors, and may include data caches. The processing block 410 also includes two communications modules 414, 416. The module 414 provides data communications between the processing cores 412 and the RDMA engine 422 described below, including providing the RDMA engine direct access to a memory (not shown) of the node in which the HFI is 400 installed. The module 416 provides data communications between the processing cores 412 and the cache coherence engine 424 described below, including issuing requests to access remote memory and responding to requests to access local memory.

The network interface block 420 provides an RDMA engine 422 that performs the standardized RDMA protocol. Hardware and firmware for such an RDMA engine 422 are known in the art, for example as sold by Intel Corporation, or Mellanox Technologies of Sunnyvale, Calif. Software that supports the hardware and firmware via application programming interfaces (APIs) may be obtained, for example, from Red Hat, Inc. of Raleigh, N.C. or Oracle Corporation of Redwood City, Calif. The network interface block 420 also provides a cache coherence engine 424 that performs distribution and tracking of cache lines, as known in the art. Hardware and firmware for such a cache coherence engine 424 are described, for example, in U.S. Pat. No. 8,407,424 entitled "Data Coherence Method and Apparatus for Multi-Node Computer System," the contents of which are incorporated herein by reference in their entirety.

The network interface block 420 also provides multiplexers 432, 434 that are used to route data transfer messages from the RDMA engine 422 and cache coherence engine 424, respectively, to data ports 442, 444. These data ports 442, 444, in turn, connect to two data communication links (e.g., existing inter-node links 280 or 352) that convey data to and from other HFIs in the HPC system. It should be appreciated that any number of data communication links may be used.

In an advantageous feature of this implementation, the multiplexers 432, 434 may be programmed by user applications to connect either the RDMA engine 422 or the cache coherence engine 424 to the data communication links. In particular, a software API for programming the multiplexers may be accessed by a user application according to algorithmic concerns. Thus, applications that require bulk data transfers may connect the RDMA engine 422 to the data communication links, while applications that require frequent random accesses to remote memory may connect the cache coherence engine 424 to the data communication links. Indeed, if programmatic precautions are taken, such accesses might be mixed within a single user application. For example, bulk data may be quickly spread out across many nodes using RDMA during an initialization phase, leveraging a scale-out programming design, while the distributed data may be accessed randomly during a compute phase, leveraging a scale-up programming design.

Figure 5:
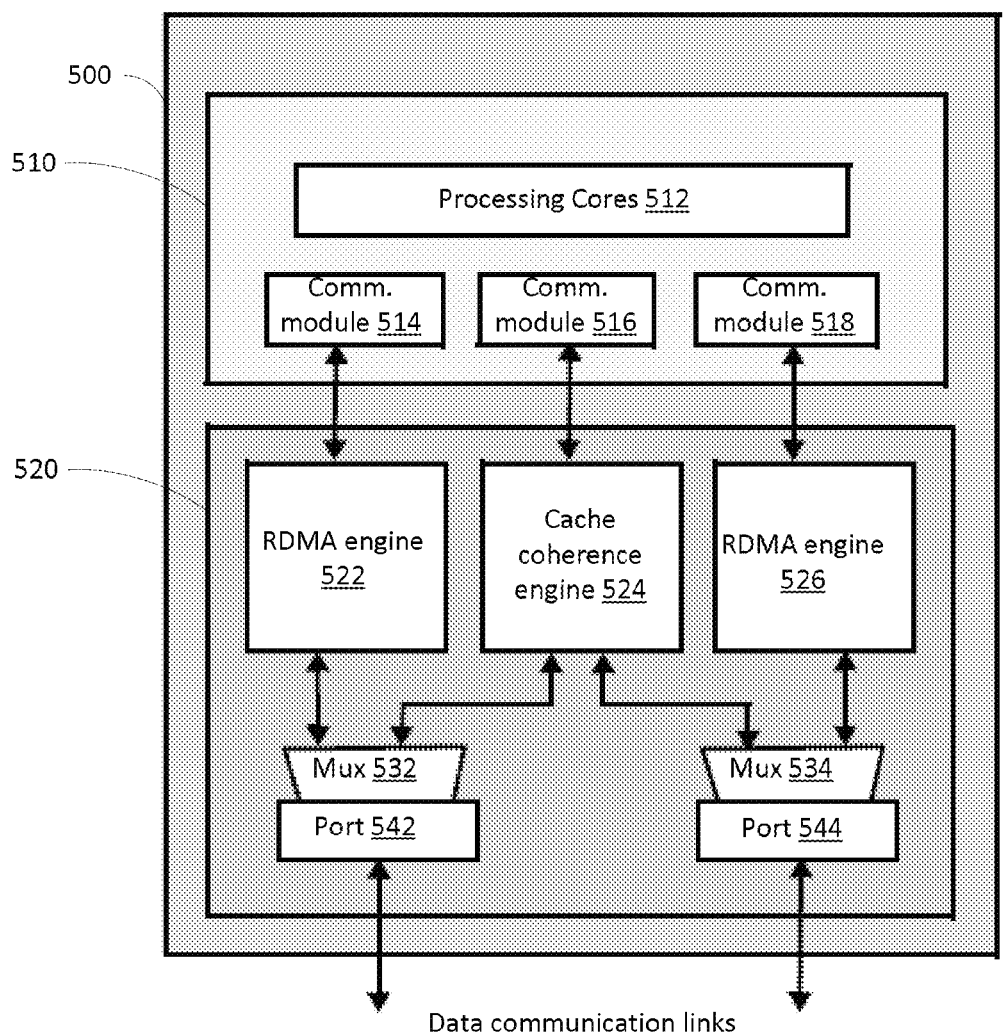
FIG. 5 schematically shows a second implementation of the disclosure having a coprocessor, two RDMA engines, cache coherence engine, and two output ports.

FIG. 5 schematically shows a second HFI implementation of the disclosure. This implementation includes similar components as the implementation of FIG. 4, but arranged in a different manner. Thus, the HFI 500 includes a processing block 510 and a network interface block 520. The processing block 510 includes processing cores 512 and three communications modules 514, 516, 518. The network interface block 520 includes two RDMA engines 522, 526, and a single cache coherence engine 524. Again, two multiplexers 532, 534 are provided to couple the functional engines 522, 524, 526 to two ports 542, 544. An advantage of the implementation of FIG. 5 over that of FIG. 4 is that two RDMA engines 522, 526 are provided, one for each port 542, 544, permitting physical parallelism and thereby speeding up RDMA accesses to and from remote nodes. Another advantage is that a single cache coherence engine 524 provides coherence functionality for cache lines sent and received on both ports 542, 544. An advantage of the implementation of FIG. 4 over that of FIG. 5 is relative simplicity of hardware, and a likely lower cost to manufacture.

Figure 6:
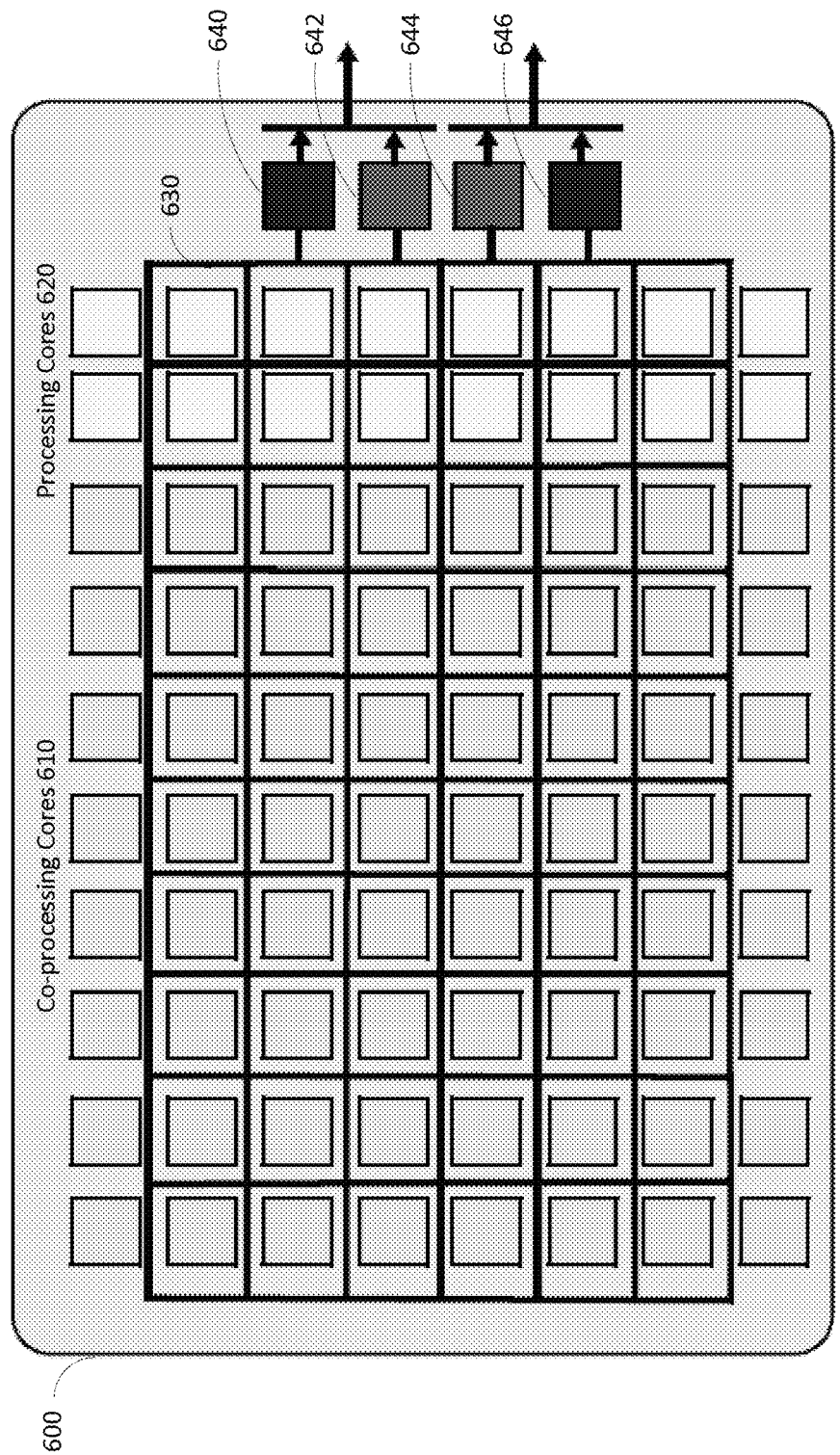
FIG. 6 schematically shows a third implementation of the disclosure having many coprocessors connected by a common bus, two RDMA engines, two cache coherence engines, and two output ports.

FIG. 6 schematically shows a third implementation of the disclosure as an HFI 600. This HFI shows a dramatic scale-up, including 32 special-purpose co-processing cores 610 and 16 general purpose processing cores 620, connected by a common bus 630. The common bus 630 connects each processing core and co-processing core to two RDMA engines 640, 646 and two cache coherence engines 642, 644. In this implementation, the cache coherence engines 642, 644 may use a common memory directory to track which remote nodes have access to the memory of the local node in which the HFI 600 is installed. It should be appreciated by a person having ordinary skill in the art that the number of processing cores and co-processing cores in FIG. 6 is exemplary only, and does not limit the scope of the disclosure.

Figure 7:
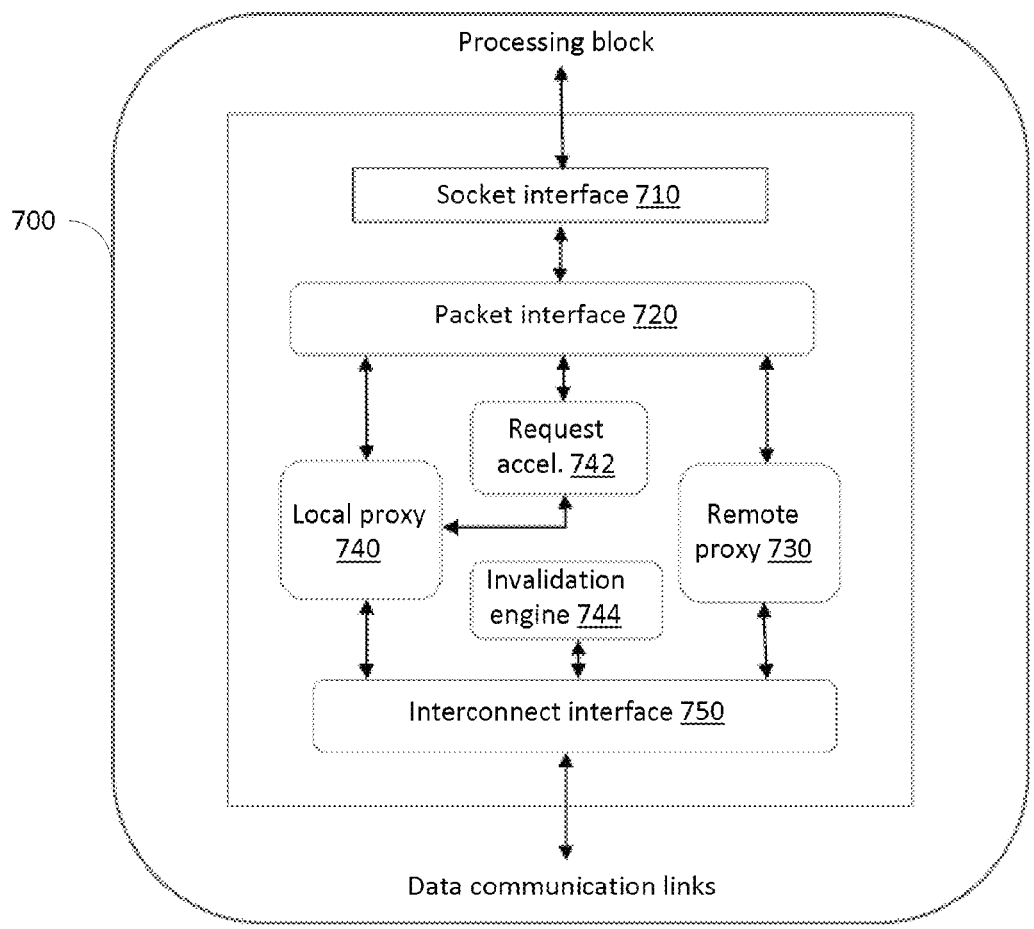
FIG. 7 schematically shows exemplary functional components within a cache coherence engine, in accordance with an implementation.

FIG. 7 schematically shows exemplary functional components within a cache coherence engine 700, in accordance with an implementation of the disclosure. The cache coherence engine 700 may correspond, for example, to cache coherence engine 424, 524, 642, or 644. It should be appreciated that the exemplary functional components of FIG. 7 need not be physically arranged in the circuitry of a cache coherence engine 700 as they are depicted, and are shown for illustration only.

The cache coherence engine 700 includes a socket interface 710. The cache coherence engine 700 is physically wired to a processor socket, and it must process communications from the processor using the processor's preferred wire protocol. One such protocol is the Universal Path Interconnect ("UPI"); an older protocol is the QuickPath Interconnect ("QPI"). The socket interface 710 implements this protocol, and packetizes requests sent to and from the socket.

The cache coherence engine 700 also includes a packet interface 720.

The packet interface 720 receives and generates requests to the socket interface 710 as packets. The packet interface 720 is responsible for all handshaking during reset or channel initialization. The packet interface 720 also receives and generates requests for all internal logic blocks described below. The packet interface 720 services multiple virtual channels with multiple requests/reply buffers.

"Southbound" requests by the local processor to access a remote memory are routed through a remote proxy 730. The remote proxy 730 tracks all local requests for remote node's memory. If a processing core in the processing block generates a memory request that resides in memory on a remote node, the remote proxy 730 will receive the request from the packet interface 720 and track it until completion. Once the remote proxy 730 has made an appropriate bookkeeping entry in its local memory, it forwards the request for remote memory to the interconnect interface 750, described in more detail below. Then, when the interconnect interface 750 receives a response, it forwards the response to the remote proxy 730, which updates its records and forwards the returned data through the packet interface 720 to the processing block.

"Northbound" requests by a remote processor to access local memory are received asynchronously by the interconnect interface 750, and routed to a local proxy 740. The local proxy 740 provides local data to remote nodes, and uses a memory directory to store what sort of access permissions the remote node is requesting. For example, according to the well-known MESI protocol, the remote node may request that the memory be Modified, Exclusive, Shared, or Invalid. The local proxy 740 may cache recent memory directory accesses in a request accelerator 742. The request accelerator 742 may be accessed by the packet interface 720 to determine the shared or exclusive coherence status of a particular local cache line, to avoid accessing the memory directory itself.

According to the cache coherence protocol, a remote node may need to be sent an invalidation message when it has a copy of a local cache line but another node has changed its contents. Thus, in carrying out the protocol, the local proxy 740 may issue invalidation messages. These messages may be implemented using an invalidation engine 744 that is directly coupled to the interconnect interface 750. The invalidation engine 744 may be used to simplify the protocol handling done in the local proxy 740.

The interconnect interface 750 provides output data that are meant for transmission on data communication links such as Ethernet or InfiniBand. Thus, the interconnect interface 750 acts as a crossbar switch between southbound messages sent by the remote proxy 730, northbound messages to local proxy 740, and messages sent or received by the invalidation engine 744.

Figure 8:
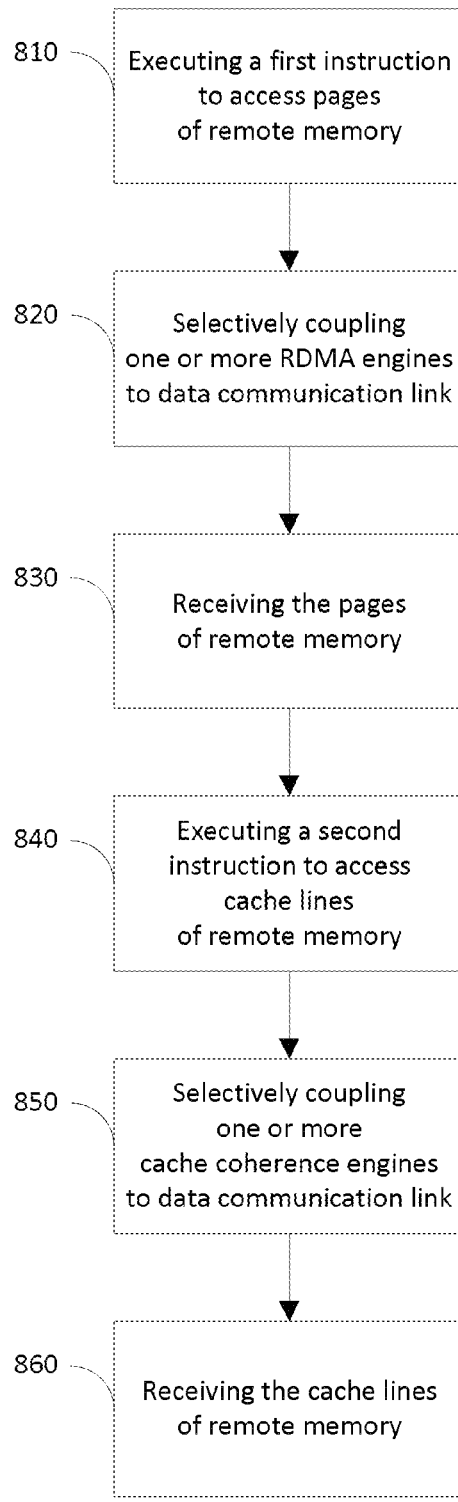
FIG. 8 schematically shows an exemplary method implementation.

FIG. 8 schematically shows an exemplary method implementation that uses the above-described apparatus. The method may be performed in a first computing node of the HPC system. The illustrated method has two parts: an initialization phase and a compute phase, as described above in connection with FIG. 4. However, it should be appreciated that methods for use with an HPC system are not limited to these phases, and may have any number of phases for diverse purposes, in any order.

Thus, in process 810 the first computing node executes a first instruction of a user application to access pages of a memory of the second computing node. As described above, this may occur during an initialization phase, because exchange of bulk data is more computationally efficient when the quantum of data distribution is larger—in this case, a page of data of perhaps 4 kilobytes (4096 bytes). Thus, in process 820, the first computing node selectively couples one or more RDMA engines to the data communication link, using one or more multiplexers. After passage of a short interval, in process 830 the first computing node receives the pages of remote memory from the second computing node.

Similar processes 840-860 occur during the compute phase. However, during computation, distributed data may be accessed randomly, for which it is better to distribute smaller quanta of data—in this case, cache lines of perhaps only 64 bytes each. Thus, in process 840 the first computing node executes a second instruction to access one or more cache lines of data from a remote computing node. While this could be any node in the HPC system, it will be described as the same, second computing node for the sake of concreteness. In process 850, the method selectively couples one or more cache coherence engines to the data communication link, using one or more multiplexers. Finally, in process 860 the first computing node receives the cache lines of memory from the second computing node.

Various implementations of the disclosure may be implemented at least in part in any conventional computer programming language. For example, some implementations may be implemented in a procedural programming language (e.g., "C"), or in an object oriented programming language (e.g., "C++"). Other implementations of the disclosure may be implemented as a pre-configured, stand-along hardware element and/or as preprogrammed hardware elements (e.g., application specific integrated circuits, FPGAs, and digital signal processors), or other related components.

In an alternative implementation, the disclosed apparatus and methods (e.g., see the various flow charts described above) may be implemented as a computer program product for use with a computer system. An implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some implementations may be implemented in a software-as-a-service model ("SAAS") or cloud computing model. Of course, some implementations of the disclosure may be implemented as a combination of both software (e.g., a computer program product) and hardware. Still other implementations of the disclosure are implemented as entirely hardware, or entirely software.

Although the above discussion discloses various exemplary implementations of the disclosure, it should be apparent that those skilled in the art can make various modifications that will achieve some of the advantages of the disclosure without departing from the true scope of the disclosure.

What is claimed is:

1. An apparatus comprising:
   one or more processing cores;
   one or more remote direct memory access (RDMA) engines, each RDMA engine separately capable of providing access by a first computing node to pages of a memory of a second computing node;
   one or more cache coherence engines, each cache coherence engine separately capable of providing access by the first computing node to cache lines of the memory of the second computing node; and
   one or more multiplexers, to selectively couple, to a data communication link according to an instruction of the user application, at least one RDMA engine or at least one cache coherence engine;
   wherein each of the one or more cache coherence engines comprises:
      a socket interface for implementing a wire protocol;
      a packet interface for receiving requests from, and generating requests to, the socket interface;
      a remote proxy for tracking requests by the first computing node to access the cache lines of the memory of the second computing node;
      a local proxy for tracking requests by the second computing node to access cache lines of a memory of the first computing node;
      a request accelerating cache for accelerating requests by the second computing node;
      an invalidation engine for carrying out a portion of a cache coherence to protocol; and
      an interconnect interface to communicate with the remote proxy, the local proxy, and the invalidation engine using the data communication link to exchange packets of the data between the first computing node and the second computing node.

2. The apparatus according to claim 1, further comprising one or more special-purpose co-processing cores that are coupled to the one or more processing cores, the one or more RDMA engines, and the one or more cache coherence engines by a common data bus.

3. The apparatus according to claim 1, wherein the data communication link has a high bandwidth and a low latency.

4. The apparatus according to claim 1, wherein the data communication link includes a networking cable or a data bus on a backplane.

5. The apparatus according to claim 1, wherein the wire protocol is the Universal Path Interconnect (UPI) or the QuickPath Interconnect (QPI).

6. The apparatus according to claim 1, wherein the cache coherence protocol is the Modified-Exclusive-Shared-Invalid (MESI) protocol.

7. A method comprising:
   executing, in a first computing node, a first instruction of a user application to access pages of a memory of a second computing node;
   selectively coupling, by one or more multiplexers, one or more remote direct memory access (RDMA) engines to a data communication link;
   receiving the pages of memory, by the first computing node from the second computing node;
   executing, in the first computing node, a second instruction of the user application to access cache lines of the memory of the second computing node;
   selectively coupling, by the one or more multiplexers, one or more cache coherence engines to the data communication link;
   receiving the cache lines of memory, by the first computing node from the second computing node; and
   separately configuring each of the one or more cache coherence engines to provide:
      a socket interface for implementing a wire protocol;
      a packet interface for receiving requests from, and generating requests is to, the socket interface;
      a remote proxy for tracking requests by the first computing node to access the cache lines of the memory of the second computing node;
      a local proxy for tracking requests by the second computing node to access cache lines of a memory of the first computing node;
      a request accelerating cache for accelerating requests by the second computing node;
      an invalidation engine for carrying out a portion of a cache coherence protocol; and
      an interconnect interface in communication with the remote proxy, and the local proxy, and the invalidation engine, for using the data communication link to exchange packets of the data between the first computing node and the second computing node.

8. The method according to claim 7, wherein executing the first instruction includes executing by a special-purpose co-processing core.

9. The method according to claim 7, wherein the wire protocol is the Universal Path Interconnect (UPI) or the QuickPath Interconnect (QPI) or wherein the cache coherence protocol is the Modified-Exclusive-Shared-Invalid (MESI) protocol.

10. A non-transitory computer-readable medium storing instructions that are executable to perform a method comprising:
   executing, in a first computing node, a first instruction of a user application to access pages of a memory of a second computing node;
   selectively coupling, by one or more multiplexers, one or more remote direct memory access (RDMA) engines to a data communication link;
   receiving the pages of memory, by the first computing node from the second computing node;

executing, in the first computing node, a second instruction of the user application to access cache lines of the memory of the second computing node;

selectively coupling, by the one or more multiplexers, one or more cache coherence engines to the data communication link;

receiving the cache lines of memory, by the first computing node from the second computing node; and separately configuring each of the one or more cache coherence engines to provide:
- a socket interface for implementing a wire protocol;
- a packet interface for receiving requests from, and generating requests to, the socket interface;
- a remote proxy for tracking requests by the first computing node to access the cache lines of the memory of the second computing node;
- a local proxy for tracking requests by the second computing node to access cache lines of a memory of the first computing node;
- a request accelerating cache for accelerating requests by the second computing node;
- an invalidation engine for carrying out a portion of a cache coherence protocol; and
- an interconnect interface in communication with the remote proxy, and the local proxy, and the invalidation engine, for using the data communication link to exchange packets of the data between the first computing node and the second computing node.

11. The non-transitory medium according to claim 10, wherein executing the first instruction includes executing by a special-purpose co-processing core.

12. The non-transitory medium according to claim 10, wherein the wire protocol is the Universal Path Interconnect (UPI) or the QuickPath Interconnect (QPI) or wherein the cache coherence protocol is the Modified-Exclusive-Shared-Invalid (MESI) protocol.

* * * * *